Aug. 21, 1951     S. P. KISH     2,565,134
METHOD OF MAKING PLASTIC DIE RACKS
Filed Jan. 8, 1949
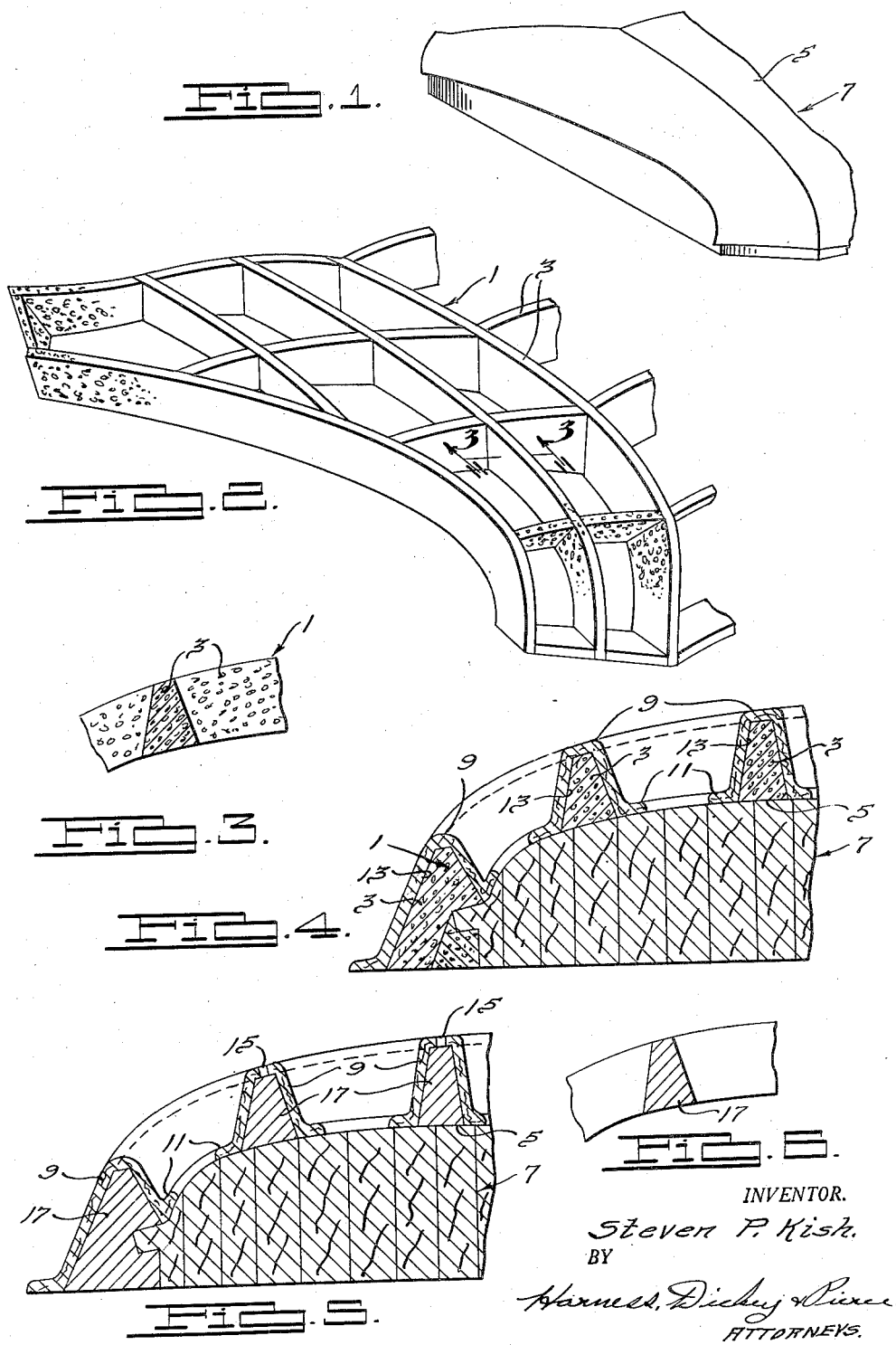
INVENTOR.
Steven P. Kish.
BY
Harness, Dickey & Pierce
ATTORNEYS.

Patented Aug. 21, 1951

2,565,134

UNITED STATES PATENT OFFICE 2,565,134

METHOD OF MAKING PLASTIC DIE RACKS

Steven P. Kish, Lansing, Mich., assignor to Kish Plastic Products, Inc., Lansing, Mich., a corporation of Michigan Application January 8, 1949, Serial No. 69,952

7 Claims. (Cl. 18—55)

This invention relates to the art of tool making and, in particular, refers to the method for making lattice-type surface reproduction fixtures, often referred to as "egg crates," such as may be used for checking purposes in the form of spotting racks and the like.

As mentioned in somewhat more detail in a companion application of the present inventor entitled "Plastic Die Model and Method of Making the Same," Serial No. 66,886, filed December 23, 1948, reproduction fixtures are ordinarily made from master models and are designed to reproduce in positive or negative form the surface of the master. Reproduction fixtures having negative surfaces are used in particular to check production parts and because of the large amount of handling that they receive, it is desirable that they be light in weight but also strong and rigid. To meet these requirements, the art has developed the so called "egg crate" fixture which consists of a latticework or frame of rigidly interconnected ribs, one surface of each of these ribs defining in combination the desired surface.

In the production of fixtures of this type, a strong and rigid framework must be used during the process as a base for the formation of the desired surface. In the past, a framework of mahogany or similar high quality but heavy wood has been used for this purpose. This framework is fashioned into a lattice or egg crate shape and, as the first step in the manufacture of the fixture, the framework is suspended in slight spaced relation with the finished surface of the master model. Clay is then packed between the surface of the model and the ribs of the frame, and the clay is trimmed flush with the side of the ribs. Plaster is then poured into the openings of the frame. After the plaster has set, the frame is removed from the master model and the clay is chipped out to form a network of interconnecting channels along the ribs of the frame. Runners or pouring apertures are formed at appropriate places in the ribs and the frame is replaced on the master model. A hardenable plastic is poured into the runners. The plastic flows through and entirely fills the channels; and in so doing it conforms to and accurately reproduces the top surface of the model. Moreover, the fluid plastic penetrates the pores of the wood and bonds or integates the plastic to the wood in such manner that for all practical purposes they are inseparable. After the plastic has cured or set, the frame is removed from the model and the plaster is knocked out of the frame openings, leaving an egg crate consisting of the original wood frame with a plastic surface defining coating thereon. Thus, the original framework forms a permanent part of the fixture.

The above procedure is tedious, time consuming, and expensive and the fixture formed by the process leaves much to be desired. The wood is heavy and tends to overcome many of the benefits of the egg crate design. Furthermore, it is very sensitive to variations in temperature and humidity. When wood is bonded to plastic material having substantially different expansion characteristics, severe and damaging distortion of the combined unit occurs very readily upon atmospheric variations. Manifestly, any distortion warps the plastic so that it no longer defines an exact negative or female duplicate of the master model. As a result the fixture is rendered imperfect and unusable.

These and other difficulties are overcome in the present invention by means of a process which employs only a temporary framework. Thus, the final product is either homogeneous or formed entirely from desired materials, such as those mentioned in the companion application referred to above. As a consequence, the product is lighter in weight and subject to little or no harmful distortion. Furthermore, the process is simpler and less expensive than the commercial process described above.

Various features of the invention will be described in connection with the accompanying drawings in which:

Fig. 1 represents the master model of the surface to be reproduced on the egg crate fixture and represents, in particular, the hood of an automobile;

Fig. 2 shows a framework that is used in the process of forming a fixture embodying a negative of the surface of Fig. 1;

Fig. 3 is a section taken on line 3—3 of Fig. 2;

Fig. 4 represents the mold forming stage of the process and is a section through a part of the master model and the framework and mold applied thereto;

Fig. 5 is a section, similar to that of Fig. 4, showing the stage wherein the mold is poured to form the final fixture, and Fig. 6 is a section, similar to that of Fig. 3, through the product of the process which in external appearance is represented by the egg crate of Fig. 2.

In the improved process for making reproduction fixtures, the usual framework 1 is formed of a plurality of individual ribs 3 that are cemented or otherwise suitably interconnected. This frame is shaped so that it roughly conforms to the surface 5, of the master model 7, which is to be reproduced. The frame 1 and ribs 3, however, are made of a material which is friable or rather easily disintegrated by chipping or similar processes calculated to break up its originally integral structure. This material should, of course, be stiff enough to support the mold which is subsequently formed thereon.

The preferred material for this purpose is sold by the Dow Chemical Co. under the trade name "Styrofoam" and is an expanded or foamed polystyrene having a compression strength of about 30 p. s. i. and weighing only about 1.6 lbs. per cu. ft. This material may be readily formed into ribs 3 and cemented together to provide a sufficiently stiff and rigid framework, and may also be easily crumbled or broken out of the mold which is subesquently formed around it without danger of cracking or breaking the mold. Instead of polystyrene or other homogeneous materials of like character, particulated material integrated by a suitable binder may in some instances be used. For example, the ribs 3 may be formed from blocks of core sand.

The framework or core 1 is placed on the surface 5 of the model 7 (Fig. 4) and a coating 9 of plaster or other suitable mold forming material applied to all the exposed surfaces and extended flangelike upon the surface 5 of the model, as shown at 11. Upon setting, the coating 9 comprises a mold containing the framework 1 as a core. The core 1 is then chipped out or extracted to leave a mold cavity 13 that is open on the lower or model engaging face. Ordinarily, the core material is entirely removed from the mold 9 but, as suggested in the abovementioned companion application, there are benefits to be gained when polystyrene or like materials are used by leaving a part of the core in the mold to become a permanent part of the final product. After the core material is removed, pouring apertures 15 are formed in the mold 9 and it is replaced on the surface 5, as shown in Fig. 5. A hardenable material 17, of which the final fixture is formed, is then poured through openings 15 into the mold cavity 13. Thermosetting plastics, such as the urea or phenol formaldehyde base resins, have proven themselves excellent for this purpose and, as suggested in the aforementioned application, they form a particularly desirable fixture in combination with a polystyrene core. The material known to the art as "Cal Resin" is very satisfactory. This material is very resistant to deterioration by physical or chemical means and has very good dimensional stability under varying conditions. The hardenable material 17 flows on the surface 5 and, of course, accurately reproduces or defines it. After this material has been cured or set, the mold coating 9 may be broken off to produce the final product which has the general egg crate appearance indicated in Fig. 2 and also contains an accurate negative of the surface 5. This product, however, as distinct from those produced by prior methods, is formed of a single material and is truly integral in the sense that it is cast in one piece rather than built-up from a plurality of individual pieces as heretofore.

In addition to the advantages of this invention, as enumerated above, those in the art will recognize others, as well as certain modifications which may be made within the spirit and scope of the invention.

What is claimed is:

1. The method of making surface reproduction tools which comprises conforming a core framework from individual pieces of stiff but friable material to the surface to be reproduced and then placing said core on said surface, forming a mold on said surface with said material as a core, removing the mold from said surface and disintegrating core material in said mold to form a cavity entirely open on the side of the mold which faces said surface, placing the mold on said surface with the open side in juxtaposition therewith, pouring hardenable material into the cavity of said mold to provide a framework similar to the core framework and reproducing the surface, and then removing the last-mentioned framework from the surface and the mold material from the framework after said material has hardened.

2. The invention as claimed in claim 1 wherein the core is made of expanded polystyrene.

3. The method of making a surface reproduction fixture which comprises first fashioning a core from individual pieces of stiff but friable material so that the framework conforms approximately to the surface to be reproduced, forming a mold on said surface with said material as a core, removing substantially all of the core material to form a mold cavity opening into the surface to be reproduced, pouring hardenable material into the cavity to form a framework similar to the core framework but accurately reproducing the surface, and removing the last-mentioned framework from the surface and the mold material from the framework after the material has hardened.

4. The method of making a surface fixture of the type described which comprises roughly fitting a temporary core to the surface, forming a mold about said core on the surface, removing the mold from said surface and breaking the core mechanically from the mold to leave a cavity having an open side defining the surface to be reproduced, placing the mold on the surface with the open side thereon, pouring hardenable material into the mold cavity, and removing the product formed in the cavity from the surface and the mold from said product after the hardenable material has solidified.

5. The method of making surface-reproduction tools comprising fabricating a core from individual pieces of expanded polystyrene so that it conforms approximately to the surface to be reproduced and placing the core thus formed on said surface, then applying a shell of a hardenable material which is mechanically substantially stronger than the core material to the exposed surfaces of said core and simultaneously extending the shell laterally over the mentioned surface adjacent to said core to form a mold, then removing the core from the shell after the latter has hardened to produce a cavity therein which opens onto the mentioned surface, then pouring hardenable plastic material in said cavity and against the portion of said surface exposed to said cavity, and then after said plastic material has hardened removing the hardened plastic from the surface and breaking the shell away from the plastic.

6. The method of making surface reproduction tools comprising forming a core approximately to the surface to be reproduced and placing the core on said surface, then applying a shell of hardenable material to the exposed surfaces of said core and simultaneously extending the shell laterally over the mentioned surface adjacent to said core to form a mold, then removing the core from the shell after the latter has hardened to produce a cavity therein which opens onto the mentioned surface, then pouring a hardenable material in said cavity and against the portion of said surface exposed to said cavity, and then after the last-mentioned hardenable material has solidified separating the solidified material from the surface and breaking the shell away therefrom.

7. The method of making surface-reproduction tools comprising forming a core approximately to the surface to be reproduced and placing the core on said surface, then covering the core and laterally adjacent portions of said surface with hardenable material to form a shell on the core, then removing the core from the shell after the latter has hardened to produce a cavity therein which opens onto the mentioned surface, then casting hardenable material in said cavity and against the portion of said surface exposed to said cavity, and then after said cast material has solidified separating the solid cast from the surface and breaking the shell away therefrom to form the tool.

STEVEN P. KISH.

REFERENCES CITED

The following references are of record in the file of this patent:

UNITED STATES PATENTS

| Number | Name | Date |
| --- | --- | --- |
| 2,039,105 | Naery | Apr. 28, 1936 |
| 2,202,683 | Baesgen et al. | May 28, 1940 |
| 2,256,247 | Groehn | Sept. 16, 1941 |
| 2,284,929 | Stewart | June 2, 1942 |
| 2,366,435 | Brown | Jan. 2, 1945 |
| 2,434,372 | Stewart | Jan. 13, 1948 |
| 2,445,583 | Moroco | July 20, 1948 |